(12) United States Patent
Ryner

(10) Patent No.: US 6,491,322 B1
(45) Date of Patent: Dec. 10, 2002

(54) ENERGY ABSORBING BRACKET ASSEMBLY FOR VEHICLE KNEE BOLSTER

(75) Inventor: Andrew F. Ryner, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/531,738

(22) Filed: Mar. 21, 2000

(51) Int. Cl.[7] .............................................. B60R 21/04
(52) U.S. Cl. ...................................... 280/751; 280/752
(58) Field of Search ................................. 280/751, 752

(56) References Cited

U.S. PATENT DOCUMENTS

| | | | |
|---|---|---|---|
| 3,774,713 A | * 11/1973 | Stegmaier | 280/751 |
| 3,831,705 A | * 8/1974 | Glance | 280/751 |
| 4,065,157 A | * 12/1977 | Abe et al. | 280/751 |
| 4,320,909 A | * 3/1982 | Nakamori et al. | 280/752 |
| 4,421,343 A | * 12/1983 | Yoshitsugu et al. | 280/752 |
| 4,834,422 A | * 5/1989 | Oikawa et al. | 280/751 |
| 4,893,834 A | * 1/1990 | Honda et al. | 280/751 |
| 4,978,136 A | 12/1990 | Tomita et al. | 280/751 |
| 5,201,544 A | 4/1993 | Matano et al. | 280/751 |
| 5,273,314 A | 12/1993 | Sakakibara | 280/752 |
| 5,311,960 A | 5/1994 | Kukainis et al. | 180/90 |
| 5,312,133 A | 5/1994 | Pietila et al. | 280/752 |
| 5,326,130 A | 7/1994 | Gedeon et al. | 280/752 |
| 5,370,417 A | 12/1994 | Kelman et al. | 280/751 |
| 5,456,494 A | 10/1995 | Witkovsky | 280/752 |
| 5,482,319 A | 1/1996 | Yoshimura et al. | 280/752 |
| 5,518,270 A | * 5/1996 | Hanada et al. | 280/751 |
| 5,577,770 A | 11/1996 | Sinner et al. | 280/752 |
| 5,584,509 A | 12/1996 | Tekelly et al. | 280/750 |
| 5,632,507 A | * 5/1997 | Sinner et al. | 280/751 |
| 5,676,216 A | * 10/1997 | Palma et al. | 180/90 |
| 5,697,667 A | * 12/1997 | Beaudet et al. | 296/189 |
| 5,865,468 A | 2/1999 | Hur | 280/752 |
| 5,927,755 A | 7/1999 | Matsuo et al. | 280/752 |
| 5,931,520 A | * 8/1999 | Seksaria et al. | 296/70 |
| 5,951,045 A | 9/1999 | Almefelt et al. | 280/748 |
| 6,017,059 A | 1/2000 | Taubenberger et al. | 280/752 |
| 6,086,098 A | * 7/2000 | Reiter et al. | 280/752 |

\* cited by examiner

Primary Examiner—Brian L. Johnson
Assistant Examiner—L. Lum
(74) Attorney, Agent, or Firm—Brooks & Kushman P.C.

(57) ABSTRACT

An energy absorbing bracket assembly (20) for supporting a knee bolster (22) on a vehicle instrument panel (12) includes a pair of brackets (30) that are each formed from sheet metal with a construction that is capable of absorbing energy even in confined spaces. Each bracket (30) includes a mounting flange (34) for mounting on the instrument panel (12), a support flange structure (38) for mounting the knee bolster (22), and a vertically extending energy absorbing section (40) having a peripheral portion (42) and a web (44) that extends from the peripheral portion adjacent the mounting flange (34) to the peripheral portion adjacent the support flange structure (38). A pair of peripheral legs (46) and (48) of the peripheral portion are located on opposite sides of the web (44) and cooperate therewith to define a pair of spaced openings (50, 52). The web (44) reinforces the bracket (30) to position the knee bolster (22) but buckles under loading to absorb energy.

12 Claims, 2 Drawing Sheets

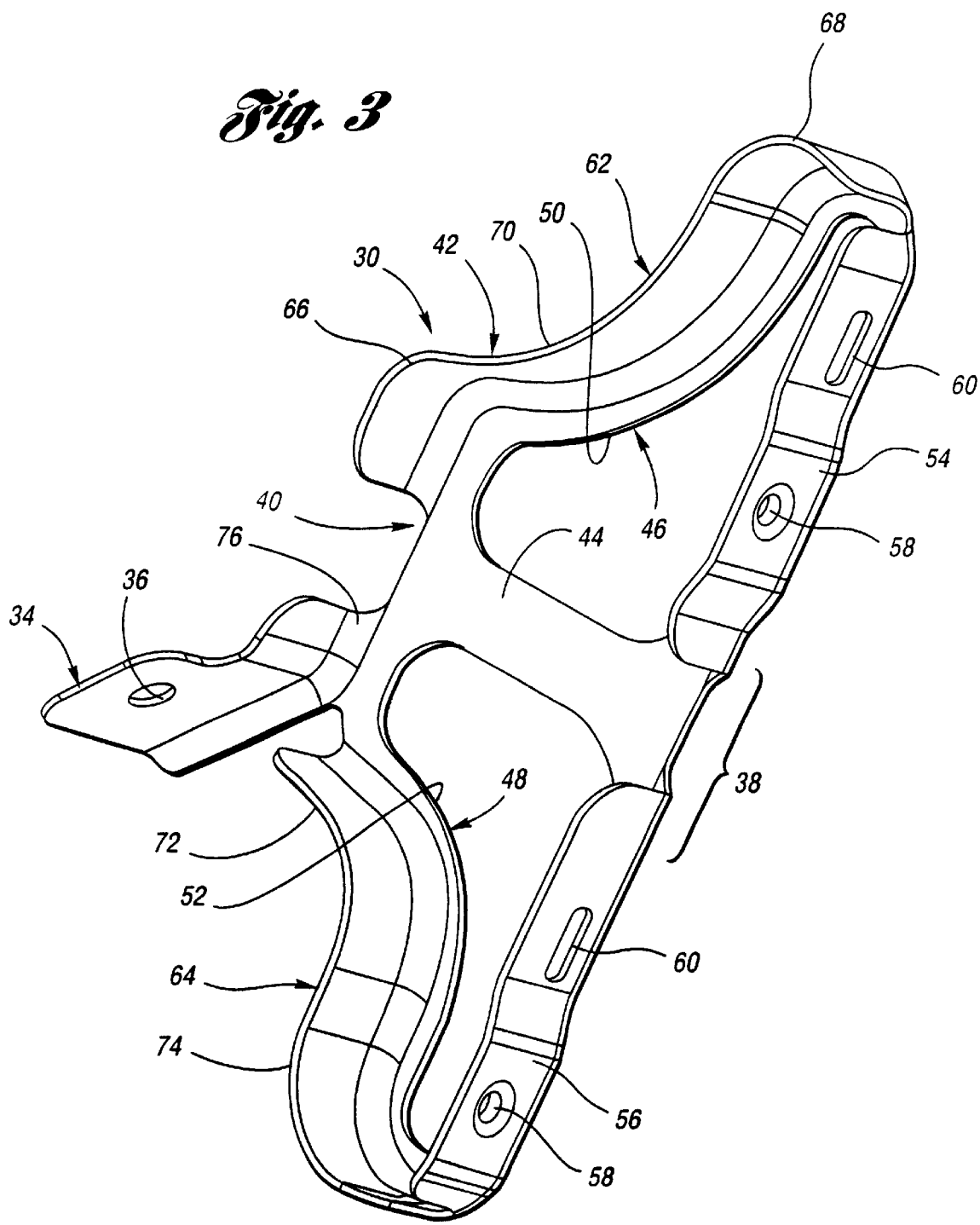

ENERGY ABSORBING BRACKET ASSEMBLY FOR VEHICLE KNEE BOLSTER

TECHNICAL FIELD

This invention relates to an energy absorbing bracket assembly for supporting a knee bolster on a vehicle instrument panel.

BACKGROUND ART

Energy absorbing bracket assemblies have previously been utilized to support knee bolsters on a vehicle instrument panel in order to absorb energy when the vehicle seat occupant is moved forwardly during a vehicle impact. However, in some vehicle constructions, there is limited room for such energy absorbing bracket assemblies to be located and still provide an energy absorbing function.

Patents noted during an investigation conducted in connection with this invention include U.S. Pat. No. 4,978,136 Tomita et al.; U.S. Pat. No. 5,201,544 Matano et al.; U.S. Pat. No. 5,273,314 Sakakibara; U.S. Pat. No. 5,311,960 Kukainis et al.; U.S. Pat. No. 5,312,133 Pietila et al.; U.S. Pat. No. 5,326,130 Gedeon et al.; U.S. Pat. No. 5,370,417 Kelman et al.; U.S. Pat. No. 5,456,494 Witkovsky; U.S. Pat. No. 5,482,319 Yoshimura et al.; U.S. Pat. No. 5,577,770 Sinner et al.; U.S. Pat. No. 5,584,509 Tekelly et al.; U.S. Pat. No. 5,865,468 Hur; U.S. Pat. No. 5,927,755 Matsuo et al.; U.S. Pat. No. 5,951,045 Almefelt et al.; and U.S. Pat. No. 6,017,059 Taubenberger et al.

DISCLOSURE OF INVENTION

An object of the present invention is to provide an improved energy absorbing bracket assembly for supporting a knee bolster on a vehicle instrument panel and capable of absorbing energy even in confined spaces.

In carrying out the above object, the energy absorbing bracket assembly for supporting a knee bolster on a vehicle instrument panel in accordance with the invention includes a pair of brackets that are formed from sheet metal. Each bracket has a mounting flange for mounting of the bracket in a generally vertically extending orientation on the vehicle instrument panel in alignment with one of the knees of a vehicle seat occupant. A support flange structure on each bracket provides for mounting of the knee bolster in front of the seat occupant. Each bracket includes a vertically extending energy absorbing section having a peripheral portion and a web that extends generally in a vertical plane from the peripheral portion adjacent the mounting flange to the peripheral portion adjacent the support flange. The peripheral portion of the energy absorbing section includes a pair of peripheral legs located on opposite sides of the web and cooperating therewith to define a pair of spaced openings. The web reinforces the bracket to position the knee bolster but buckles under loading to absorb energy.

In the preferred construction of the bracket assembly, the mounting flange of each bracket extends perpendicular to the generally vertically extending energy absorbing section thereof to provide mounting on the vehicle instrument panel. The support flange structure of each bracket also preferably extends perpendicular to the generally vertically extending energy absorbing section thereof to provide mounting of the knee bolster. This support flange structure of each bracket also preferably includes two flanges that are respectively aligned with the pair of spaced openings on the opposite sides of the web of the energy absorbing section of the bracket.

In the preferred construction, the peripheral legs of the energy absorbing section of each bracket include reinforcement flanges that extend perpendicular to the web of the energy absorbing section. The reinforcement flanges of the pair of peripheral legs of each bracket have curved shapes that extend between the mounting flange and the support flange structure, preferably with an ogee shape. One of the peripheral legs of each bracket is an upper leg whose reinforcement flange has outwardly convex shapes adjacent the mounting flange and adjacent the support flange structure. The reinforcement flange of the upper leg has an outwardly concave shape between its outwardly convex shapes. The other peripheral leg of each bracket is a lower leg whose reinforcement flange has an outwardly concave shape adjacent the mounting flange and an outwardly convex shape adjacent the support flange structure. The mounting flange of each bracket preferably has a connection to the peripheral portion of the energy absorbing section at a location toward the lower leg from the web.

The objects, features and advantages of the present invention are readily apparent from the following detailed description of the best mode for carrying out the invention when taken in connection with the accompanying drawings.

BRIEF DESCRIPTION OF DRAWINGS

FIG. 3 is a perspective view illustrating the construction of each of the brackets of the bracket assembly.

BEST MODE FOR CARRYING OUT THE INVENTION

Figure 1:
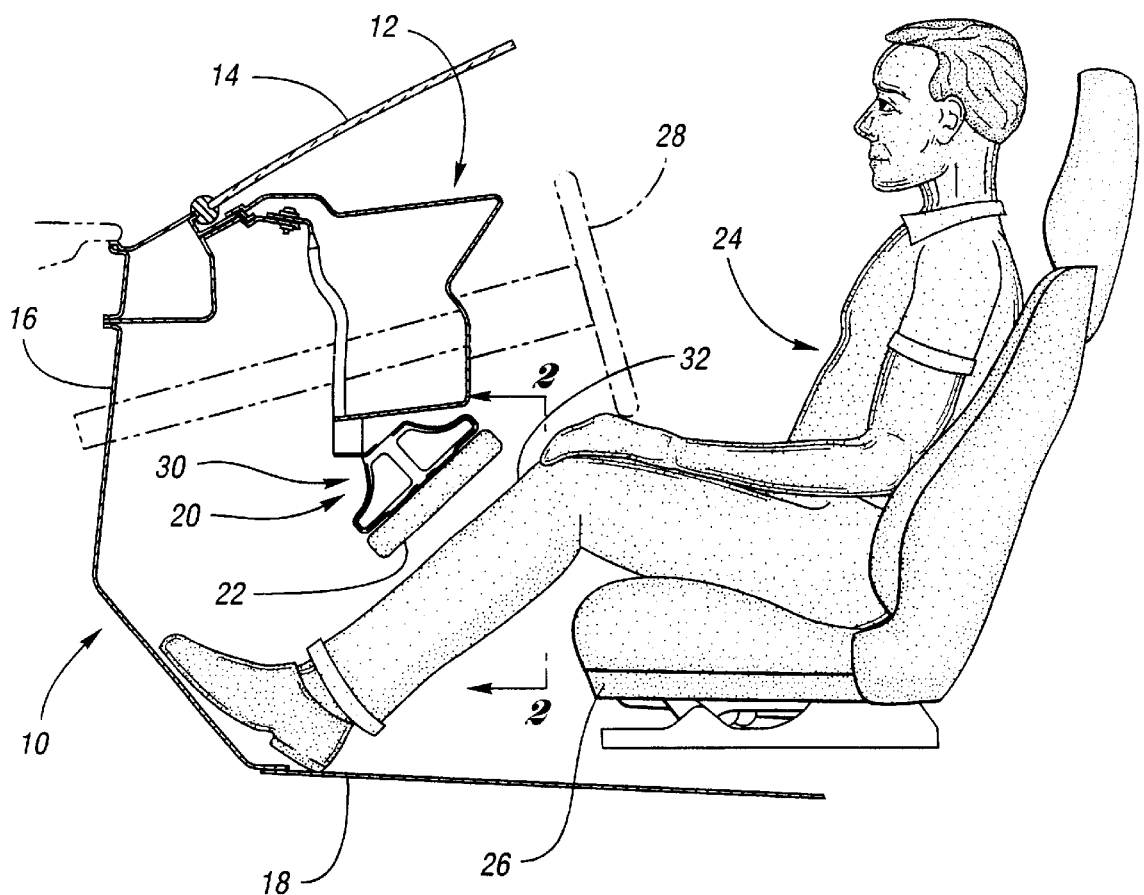
FIG. 1 is a somewhat schematic side view taken in section through a vehicle whose instrument panel supports a knee bolster in front of a seat occupant by an energy absorbing bracket assembly constructed in accordance with the invention.

With reference to FIG. 1, a vehicle schematically indicated by 10 is shown as including an instrument panel 12 that is located below the windshield 14 and to the rear of the engine compartment wall 16 that extends downwardly to the floor 18. A bracket assembly 20 constructed in accordance with the invention is mounted on the instrument panel 12 as is hereinafter more fully described and supports a knee bolster 22 forwardly of the seat occupant 24 sitting on the vehicle seat 26. While the bracket assembly 20 is illustrated adjacent a steering wheel 28 so as to be operable for a vehicle driver, it should be appreciated that the invention can also be utilized with vehicle seat passengers as well.

Figure 2:
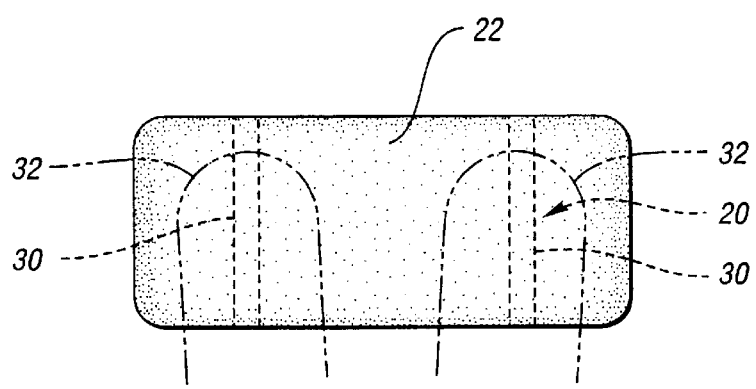
FIG. 2 is an elevational view taken along the direction of line 2—2 in FIG. 1 to illustrate that the bracket assembly includes a pair of brackets that are in respective alignment with the knees of the vehicle seat occupant.

With further reference to FIG. 2, the bracket assembly 20 is illustrated as including a pair of brackets 30 that extend generally vertically so as to support the knee bolster 22 at locations aligned with the knees 32 of the seat occupant.

With further reference to FIG. 3, each of the pair of brackets 30 is formed from sheet metal, normally by a stamping operation performed on cold rolled steel. Each bracket 30 has a mounting flange 34 that includes a fastener opening 36 for permitting a fastener to secure the bracket to the vehicle instrument panel as previously described in connection with FIGS. 1 and 2. A support flange structure 38 of each bracket 30 mounts the knee bolster in front of the vehicle seat occupant as previously described. Each bracket 30 also includes a vertically extending energy absorbing section 40 having a peripheral portion 42 and a web 44 that extends generally in a vertical plane from the peripheral portion adjacent the mounting flange 34 to the peripheral portion adjacent the support flange structure 38. The peripheral portion 40 of the energy absorbing section includes a pair of peripheral legs 46 and 48 that respectively occupy upper and lower positions in the assembled condition. These upper and lower legs 46 and 48 cooperate with the web to define a pair of spaced openings 50 and 52 that likewise occupy upper and lower positions. The web 44 reinforces the bracket to position the knee bolster but buckles under loading to absorb energy in cooperation with the upper and lower legs 46 and 48 of the energy absorbing section 40. These upper and lower legs 46 and 48 diverge from each other in a direction along the web 44 toward the mounting flange structure 38 such that forward pressure applied to the bracket tends to increase their divergence and thereby tensions the energy absorbing section 40 adjacent the knee bolster support flange structure 38. This tensioning in cooperation with the buckling of the web 44 and bending of the upper and lower legs 46 and 48 provides the energy absorbing function that is effective even in confined spaces.

With continuing reference to FIG. 3, the mounting flange 34 of each bracket 30 extends perpendicular to the generally vertically extending energy absorbing section 40 thereof to provide the mounting on the vehicle instrument panel. Furthermore, the support flange structure 38 of each bracket 30 also extends perpendicular to the generally vertically extending energy absorbing section 40 to provide mounting of the knee bolster. This knee bolster support flange structure 38 as illustrated includes two flanges 54 and 56 that are respectively aligned with the pair of spaced openings 50 and 52 on the opposite sides of the web 44 of the energy absorbing section 40. Each of the flanges 54 and 56 includes a round opening 58 and a slotted opening 60 that are utilized in positioning and securement of the knee bolster to the bracket. These flanges 54 and 56 extend perpendicular to the generally vertically extending energy absorbing section 40 to provide the mounting of the knee bolster.

As shown by continuing reference to FIG. 3, the pair of upper and lower peripheral legs 46 and 48 of the energy absorbing section 40 of each bracket 30 include reinforcement flanges 62 and 64 that extend perpendicular to the web 44 of the energy absorbing section 40. These reinforcement flanges 62 and 64 each have curved shapes that extend between the mounting flange 34 and the support flange structure 38, preferably with a generally ogee shape. More specifically, the reinforcement flange 62 of the upper peripheral leg 46 has outwardly convex shapes 66 and 68 adjacent the mounting flange 34 and the support flange structure 38 as well as having an outwardly concave shape 70 between its outwardly convex shapes. Furthermore, the lower peripheral leg 48 of each bracket 30 has its reinforcement flange provided with an outwardly concave shape 72 adjacent the mounting flange 34 and an outwardly convex shape 74 adjacent the support flange structure 38.

The mounting flange 34 of each bracket 30 has a connection 76 to the peripheral portion 42 of the energy absorbing portion 40 at a location toward the lower leg 48 from the web 44.

While the best mode for carrying out the invention has been described in detail, those familiar with the art to which this invention will recognize various alternative designs and embodiments for practicing the invention as defined by the following claims.

What is claimed is:

1. An energy absorbing bracket assembly for supporting a knee bolster on a vehicle instrument panel, the energy absorbing bracket assembly comprising:

a pair of brackets that are formed from sheet metal and each having a mounting flange for mounting thereof in a generally vertically extending orientation on the vehicle instrument panel in alignment with one of the knees of a vehicle seat occupant;

a support flange structure on each bracket for mounting the knee bolster in front of the seat occupant; and each bracket including a vertically extending energy absorbing section having a peripheral portion and a web that extends generally in a vertical plane from the peripheral portion adjacent the mounting flange to the peripheral portion adjacent the support flange structure, the peripheral portion of the energy absorbing section including a pair of peripheral legs located on opposite sides of the web and cooperating therewith to define a pair of spaced openings, and the web reinforcing the bracket to position the knee bolster but buckling under loading to absorb energy.

2. A vehicle knee bolster energy absorbing bracket assembly as in claim 1 wherein the mounting flange of each bracket extends perpendicular to the generally vertically extending energy absorbing section thereof to provide mounting on the vehicle instrument panel.

3. A vehicle knee bolster energy absorbing bracket assembly as in claim 1 wherein the support flange structure of each bracket extends perpendicular to the generally vertically extending energy absorbing section thereof to provide mounting of the knee bolster.

4. A vehicle knee bolster energy absorbing bracket assembly as in claim 1 wherein the support flange structure of each bracket includes two flanges that are respectively aligned with the pair of spaced openings on the opposite sides of the web of the energy absorbing section of the bracket.

5. A vehicle knee bolster energy absorbing bracket assembly as in claim 1 wherein the support flange structure of each bracket includes two flanges that are respectively aligned with the pair of spaced openings on the opposite sides of the web of the energy absorbing section of the bracket and that extend perpendicular to the generally vertically extending energy absorbing section thereof to provide mounting of the knee bolster.

6. A vehicle knee bolster energy absorbing bracket assembly as in claim 1 wherein the pair of peripheral legs of the energy absorbing section of each bracket include reinforcement flanges that extend perpendicular to the web of the energy absorbing section.

7. A vehicle knee bolster energy absorbing bracket assembly as in claim 6 wherein the reinforcement flanges of the pair of peripheral legs of each bracket have curved shapes that extend between the mounting flange and the support flange structure.

8. A vehicle knee bolster energy absorbing bracket assembly as in claim 7 wherein the reinforcement flanges of the pair of peripheral legs of each bracket has an ogee shape.

9. A vehicle knee bolster energy absorbing bracket assembly as in claim 8 wherein one of the peripheral legs of each bracket is an upper leg whose reinforcement flange has an outwardly convex shape adjacent the mounting flange and also has an outwardly convex shape adjacent the support flange structure, the reinforcement flange of the upper leg having an outwardly concave shape between its outwardly convex shapes, and the other peripheral leg of each bracket being a lower leg whose reinforcement flange has an outwardly concave shape adjacent the mounting flange and an outwardly convex shape adjacent the support flange structure.

10. A vehicle knee bolster energy absorbing bracket assembly as in claim 9 wherein the mounting flange of each bracket has a connection to the peripheral portion of the energy absorbing section at a location toward the lower leg from the web.

11. An energy absorbing bracket assembly for supporting a knee bolster on a vehicle instrument panel, the energy absorbing bracket assembly comprising:

a pair of brackets that are formed from sheet metal and each having a mounting flange for mounting thereof in a generally vertically extending orientation on the vehicle instrument panel in alignment with one of the knees of a vehicle seat occupant;

a support flange structure including two flanges on each bracket for mounting the knee bolster in front of the seat occupant; and each bracket including a vertically extending energy absorbing section from which the mounting flange and support flange structure extend in a perpendicular relationship, the energy absorbing section including a peripheral portion and a web that extends generally in a vertical plane from the peripheral portion adjacent the mounting flange to the peripheral portion adjacent the support flange structure, the peripheral portion of the energy absorbing section including a pair of peripheral legs located on opposite sides of the web and cooperating therewith to define a pair of spaced openings that are respectively aligned with the two flanges of the support flange structure, and the web reinforcing the bracket to position the knee bolster but buckling under loading to absorb energy.

12. An energy absorbing bracket assembly for supporting a knee bolster on a vehicle instrument panel, the energy absorbing bracket assembly comprising:

a pair of brackets that are formed from sheet metal and each having a mounting flange for mounting thereof in a generally vertically extending orientation on the vehicle instrument panel in alignment with one of the knees of a vehicle seat occupant;

a support flange structure including two flanges on each bracket for mounting the knee bolster in front of the seat occupant; and each bracket including a vertically extending energy absorbing section from which the mounting flange and support flange structure extend in a perpendicular relationship, the energy absorbing section including a peripheral portion and a web that extends generally in a vertical plane from the peripheral portion adjacent the mounting flange to the peripheral portion adjacent the support flange structure, the peripheral portion of the energy absorbing section including upper and lower peripheral legs located on opposite sides of the web and cooperating therewith to define a pair of spaced openings that are respectively aligned with the two flanges of the support flange structure, the upper and lower peripheral legs having reinforcement flanges that extend perpendicular to the web of the energy absorbing section, the reinforcement flange of the upper peripheral leg of each bracket having an outwardly convex shape adjacent the mounting flange and having an outwardly convex shape adjacent the support flange structure and also having an outwardly concave shape between its outwardly convex shapes, and the reinforcement flange of the lower peripheral leg of each bracket having an outwardly concave shape adjacent the mounting flange and an outwardly convex shape adjacent the support flange structure, and the web reinforcing the bracket to position the knee bolster but buckling under loading to absorb energy.

* * * * *